United States Patent Office 3,102,131
Patented Aug. 27, 1963

3,102,131
AMINE SALTS OF TETRA-COVALENT BORON COMPOUNDS
Edwin C. Knowles, Poughkeepsie, N.Y., and Edward L. Kay, Akron, Ohio, assignors to Texaco Inc., New York, N.Y., a corporation of Delaware
No Drawing. Filed Jan. 17, 1961, Ser. No. 83,175
16 Claims. (Cl. 260—462)

This invention relates to novel amine salts of boron containing acids. More particularly, this invention relates to primary, secondary and tertiary amine salts of tetra-covalent boron "acids."

The usefulness of many organo-boron compounds, for example, such borate esters as lubricating oil additives, has been seriously hindered by their hydrolytic instability so as to preclude their commercial use as lubricant additives. The advantage of the boron compounds of the present invention are that they are hydrolytically stable, oxidation stable and thermally stable in both storage and use. The novel amine salts of the present invention formed by reaction of an aliphatic hydrocarbyl amine and a tetra-covalent boron "acid" are useful as load carrying additives for mineral and synthetic base lubricating oils. Our commonly-assigned, copending application, Serial No. 83,181, filed of even date, relates to lubricating compositions containing selected high molecular weight amine salts of this invention.

The amine salts of tetra-covalent boron "acids" of the present invention are represented by the following general formulae:

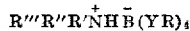

and

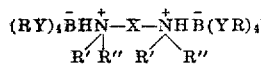

wherein Y may be oxygen or sulfur, X is an aliphatic hydrocarbylene radical containing 2 to 10 carbon atoms, R is a hydrocarbyl radical containing 1 to 24 carbon atoms, R' is an aliphatic hydrocarbyl or halogen substituted hydrocarbyl radical containing one or more carbon atoms and preferably 8 to about 30 carbon atoms and R" and R''' are hydrogen or aliphatic hydrocarbyl or halogen substituted aliphatic hydrocarbyl radicals containing 1 to 24 carbon atoms.

The term hydrocarbyl radical when used herein denotes mono-valent hydrocarbon radical. The term hydrocarbylene when used herein denotes divalent hydrocarbon radical.

In accordance with the present invention, novel amine salts of tetra alkoxide or aryloxide or mercaptide boron "acid" composition may be produced by the following general process:

The compositions of the present invention are prepared by the reaction of a tetra alkoxide, aryloxide or mercaptide boron "acid" with high molecular weight, at least 1 and preferably at least 8 total carbon atoms, primary, secondary, tertiary aliphatic amine or aliphatic diamine. The reaction mixture diluted with solvent is heated to reflux temperature at normal atmospheric pressure. The reaction mixture was filtered, the solvent is stripped at atmospheric pressure and the amine salt of the present invention is obtained.

The aliphatic amines employed in the formation of the novel amine salts of tetra alkoxide, aryloxide or mercaptide boron acids are represented by the formula:

R'''R''R'N wherein R' is an aliphatic hydrocarbyl or halogen substituted hydrocarbyl radical containing at least one or more carbon atoms and preferably at least 8 to 30 carbon atoms and R" and R''' are hydrogen, aliphatic hydrocarbyl or halogen substituted aliphatic hydrocarbyl radicals containing 1 to 24 carbon atoms. Examples of effective primary, secondary and tertiary amines are: ethylamine, beta chloroethyl amine, isopropylamine, 2-ethylhexylamine, n-propylamine, n-amylamine, triamylamine, t-octylamine, laurylamine and mixtures of primary aliphatic amines such as commercially available mixtures of t-alkyl primary amine. Such mixtures include branched chain t-alkyl primary amines containing 11 to 14 carbon atoms and a mixture of t-alkyl primary amines wherein the alkyl group contains 18 to 22 carbon atoms.

The aliphatic diamines employed in the formation of the novel amine salts of the present invention are represented by the formula:

R''$_2$NXNR''$_2$ wherein X is an aliphatic hydrocarbylene radical containing 2 to 10 carbon atoms and R" may be either hydrogen or an aliphatic hydrocarbyl containing 1 to 24 carbon atoms or one of each. Examples of effective diamines are ethylenediamine, 1,2 - propylenediamine, 1,3 - propylenediamine, 1,2 - butylenediamine, 1,6 - hexylenediamine, 1,8-octylenediamine and 1,4-butylenediamine.

The tetra alkoxide, aryloxide or mercaptide boron "acids" employed in the formation of the present invention are transitory compounds, and, as such do not exist in the isolated state. They do, however, form stable salts. The "acids" are formed by reacting a boron tri-alkoxy, -aryloxy or -mercaptide with an alcohol, phenol, water or thiol compound as represented by the following general equation:

wherein R is either hydrogen or an aliphatic hydrocarbyl radical containing 1 to 24 carbon atoms and Y can be either oxygen or sulfur.

The tetra-alkoxide, aryloxide or mercaptide boron "acids" employed in the formation of the amine salts of the present invention can be represented by the formula:

HB(YR)$_4$ wherein Y can be an oxygen or sulfur and R is a hydrocarbyl radical containing 1 to 24 carbon atoms. Examples of effective "acids" are tetra methoxy boro acid, tetra-n-propoxy boro acid, tetra secondary butoxy boro acid, tetra benzyloxy boro acid, tetra (nonylphenoxy) boro acid, tri-n-propoxy-isopropoxy boro acid, tri-n-propoxy-n-butoxy boro acid, tri - n - propoxy-isobutoxy boro acid, tri-n-propoxy-secondary-butoxy boro acid, tri-n-propoxy-tertiary-butoxy boro acid, tri-n-propoxy boro acid, tri-n-propoxy-n-hexoxy boro acid, tri - n - propoxy-2-ethylhexoxy boro acid, tri-n-propoxy-oleyloxy boro acid, tri-n-propoxy-benzyloxy boro acid, tri-n-propoxy-tetrahydrofurfuryloxy boro acid, tri-n-propoxy-propyl mercapto boro acid, tri-n-propoxy-dodecyl mercapto boro acid, tri-n-propoxy-betachloroethoxy boro acid, tri-n-propoxy-nonylphenoxy boro acid, tri-n-propoxy-meta-methylphenoxy boro acid, trioleyloxy-dodecoxy boro acid, tri-oleyloxy-dodecyl mercapto boro acid and tri-(nonylphenoxy)-n-propoxy boro acid.

Upon the formation of the transistory "acids," described above, the amine is reacted therewith to obtain the amine salts of the present invention, the reaction for which can be represented by the following general equation:

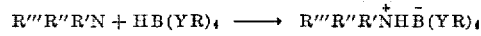

wherein Y may be oxygen or sulfur, R is a hydrocarbyl radical containing 1 to 24 carbon atoms, R' is an aliphatic hydrocarbyl or hydroxy substituted hydrocarbyl radical containing one or more carbon atoms and preferably at least 8 to 30 carbon atoms and R″ and R‴ are hydrogen, aliphatic hydrocarbyl or halogen substituted aliphatic hydrocarbyl radicals containing 1 to 24 carbon atoms.

The preparation of the specific novel acid amine salts of tetra-covalent boron acids of the present invention is illustrated in the following examples:

EXAMPLE I

*Preparation of Amine Salt of Tetra-n-Propoxy Boro "Acid"*

A pentane slurry of 300 grams, 5.0 mols, of n-propyl alcohol and 940 grams, 5.0 mols, of tri-n-propyl borate was formed and 1000 grams, 5.0 mols of t-$C_{11}$–$C_{14}$ mixture alkyl primary amine was added thereto and the pot temperature rose from 25 to 31° C. Solvents and volatiles were removed by distillation and the $C_{11}$–$C_{14}$ alkyl primary amine boro tetra-n-propylate having the formula:

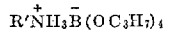

wherein R′ is a tertiary alkyl group containing 11 to 14 carbon atoms, was isolated.

EXAMPLE II

*Preparation of Amine Salt of Tetra-Benzyloxy Boro "Acid"*

A pentane slurry of 966 grams, 3.0 mols, of tri-benzyl borate and 324 grams, 3.0 mols, of benzyl alcohol was formed and 600 grams, 3.0 mols of t-$C_{11}$–$C_{14}$ mixture alkyl primary amine was added thereto and the pot temperature rose from 28° C. to 35° C. Solvent and volatiles were removed by distillation and t-$C_{11}$–$C_{14}$ alkyl primary amine-boro-tetrabenzylate having the formula:

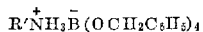

wherein R′ is a tertiary alkyl group containing 11 to 14 carbon atoms, was isolated.

EXAMPLE III

*Preparation of Amine Salt of Tri-n-Propoxy Nonylphenoxy Boro "Acid"*

A pentane slurry of 564 grams, 3.0 mols, tri-n-propyl borate and 660 grams, 3.0 mols, nonylphenol was formed and 600 grams 3.0 mols t-$C_{11}$–$C_{14}$ mixture alkyl primary amine was added thereto and the pot temperature rose from 28° C. to 40° C. The solvent and volatiles were removed by distillation and the t-$C_{11}$–$C_{14}$ alkyl primary amine-boro tri-n-propylate-nonylphenolate having the formula:

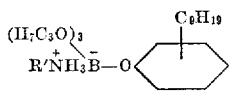

wherein R′ is a tertiary alkyl group having 11 to 14 carbon atoms, was isolated.

EXAMPLE IV

*Preparation of Amine Salt of Tetra-Methoxy Boro "Acid"*

A pentane slurry of 52 grams, 0.5 mol, tri-methyl borate and 16 grams, 0.5 mol, of methanol was formed and 157.5 grams, 0.5 mol, of t-$C_{18}$–$C_{22}$ mixture alkyl primary amine was added thereto and the pot temperature rose from 26° C. to 40° C. The solvent and volatiles were removed by distillation and the t-$C_{18}$–$C_{22}$ alkyl primary amine-boro tetra methylate having the formula:

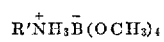

wherein R′ is a tertiary alkyl group having 18 to 22 carbon atoms, was isolated.

EXAMPLE V

*Preparation of Amine Salt of Tetra-Nonylphenoxy Boro "Acid"*

A slurry of 668 grams, 1.0 mol, tri-nonylphenyl borate and 220 grams 1.0 mol, of nonylphenol was formed and 195 grams, 1.0 mol, of t-$C_{11}$–$C_{14}$ mixture alkyl primary amine was added thereto and the pot temperature rose from 31° C. to 63° C. The solvent and volatiles were removed by distillation and the t-$C_{11}$–$C_{14}$ alkyl primary amine-boro tetra-nonylphenolate having the formula:

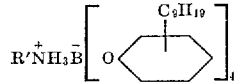

wherein R′ is a tertiary alkyl group having 11 to 14 carbon atoms, was isolated.

EXAMPLE VI

*Preparation of Amine Salt of Tri-n-Propoxy-Dodecyl Mercapto Boro "Acid"*

A pentane slurry of 188 grams, 1.0 mol, tri-n-propyl borate and 202 grams, 1.0 mol, of dodecanethiol was formed and 200 grams, 1.0 mol of t-$C_{11}$–$C_{14}$ mixture alkyl primary amine was added thereto. The solvent and volatiles were removed by distillation and the t-$C_{11}$–$C_{14}$ alkyl primary amino-boro tri-n-propylate-dodecylthiolate having the formula:

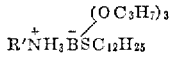

wherein R′ is a tertiary alkyl group having 11 to 14 carbon atoms, was isolated.

EXAMPLE VII

*Preparation of Ethylene Diamine Di-(Boro-Tri-Methylate)*

3.2 grams, 0.1 mol, of methyl alcohol was mixed with 10.4 grams, 0.1 mol, of tri-methyl borate. Thereafter 3.0 grams, 0.05 mol, of anhydrous ethylene diamine was added to the reaction mixture and a white water soluble solid was obtained. The reaction temperature rose from 25° C. to 53° C. during the reaction to obtain the ethylene diamine di(boro tetra methylate) having the formula:

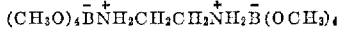

EXAMPLE VIII

*Preparation of Ethylene Diamine Di-(Boro Trimethylate-Nonylphenolate)*

22 grams, 0.1 mol, of nonylphenol was mixed with 10.4 grams, 0.1 mol, of tri-methyl borate. Thereafter 3.0 grams, 0.05 mol, of anhydrous ethylene diamine was added to the reaction mixture and a white water insoluble solid was obtained. The reaction temperature rose from 29° C. to 55° C. during the reaction to obtain the ethylene diamine di-(boro tri-methylate-nonylphenolate) having the formula:

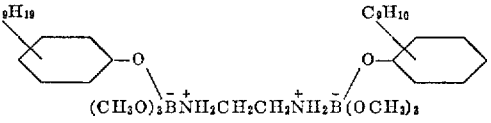

EXAMPLE IX

*Preparation of Ethylene Diamine Di-(Boro Trimethylate-n-Hexylate)*

10.2 grams, 0.1 mol, n-hexyl alcohol was mixed with 10.4 grams, 0.1 mol, of tri-methyl borate. Thereafter 3.0 grams, 0.05 mol, of anhydrous ethylene diamine was added to the reaction mixture and a white water soluble solid was obtained. The reaction temperature rose from 29° C. to 55° C. during the reaction to obtain the ethylene diamine di-(boro trimethylate-n-hexylate) having the formula:

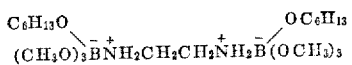

EXAMPLE X

*Preparation of Ethylene Diamine Di-(Boro Tri-methylate Dodecylate)*

18.6 grams, 0.1 mol, of dodecyl alcohol was mixed with 10.4 grams, 0.1 mol, of tri-methyl borate. Thereafter 3.0 grams, 0.05 mol, of anhydrous ethylene diamine was added to the reaction mixture and a white water insoluble solid was obtained. The reaction temperature rose from 26° C. to 55° C. during the reaction to obtain the ethylene diamine di-(boro tri-methylate dodecylate) having the formula:

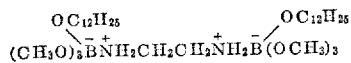

EXAMPLE XI

*Preparation of Ethylene Diamine Di-(Boro Tri-Nonylphenolate-Methylate)*

3.2 grams, 0.1 mol, of methyl alcohol was mixed with 66.8 grams, 0.1 mol, of tri-(nonylphenyl) borate. Thereafter 3.0 grams, 0.05 mol, of an anhydrous ethylene diamine was added to the reaction mixture. The reaction temperature rose from 25° C. to 40° C. obtaining a hazy amber gel soluble in water which was the isolated ethylene diamine di-(boro tri-nonylphenolate methylate) having the formula:

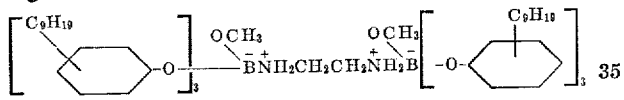

EXAMPLE XII

*Preparation of Ethylene Diamine Di-(Boro Tetra Nonylphenolate)*

22 grams, 0.1 mol, of nonylphenol was mixed with 66.8 grams, 0.1 mol, of tri-nonylphenyl borate. Thereafter 3.0 grams, 0.05 mol, of anhydrous ethylene diamine were added to the reaction mixture. The reaction temperature rose from 31° C. to 50° C. obtaining a very viscous amber liquid insoluble in water which was the isolated ethylene diamine di-(boro tetra nonylphenolate) having the formula:

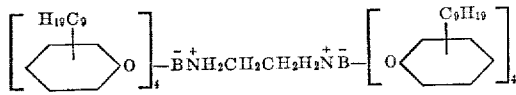

EXAMPLE XIII

*Preparation of Ethylene Diamine Di-(Boro Tri-Nonylphenolate n-Hexylate)*

10.2 grams, 0.1 mol, of n-hexyl alcohol were mixed with 66.8 grams, 0.1 mol, of tri-nonylphenyl borate. Thereafter 3.0 grams, 0.05 mol, of anhydrous ethylene diamine were added to the reaction mixture. The reaction temperature rose from 31° C. to 50° C. obtaining a very viscous amber liquid insoluble in water which was the isolated ethylene diamine di-(boro tri-nonylphenolate n-hexylate) having the formula:

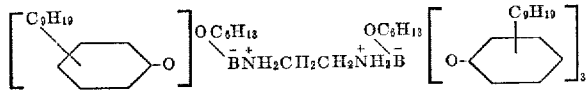

EXAMPLE XIV

*Preparation of Ethylene Diamine Di-(Boro-Tri-Nonylphenolate Dodecylate)*

18.6 grams, 0.1 mol, of dodecyl alcohol were mixed with 66.8 grams, 0.1 mol, of tri-nonylphenol borate. Thereafter 3.0 grams, 0.05 mol, of anhydrous ethylene diamine were added to the reaction mixture. The reaction temperature rose from 27° C. to 40° C. obtaining a very viscous amber liquid insoluble in water which was ethylene diamine di-(boro-tri-nonylphenolate dodecylate) having the formula:

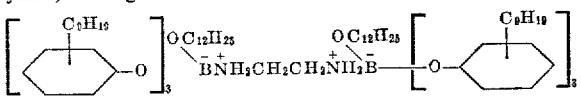

EXAMPLE XV

*Preparation of Hexane Diamine-1,6-Di-(Boro Tetra Methylate)*

3.2 grams, 0.1 mol, of methyl alcohol were mixed with 10.4 grams, 0.1 mol, of trimethyl borate. Thereafter 5.8 grams, 0.05 mol, of hexane diamine-1,6 was added and the reaction temperature rose from 25° C. to 50° C. and a white water soluble solid was obtained which was the hexane diamine-1,6-di-(boro tetra methylate) having the formula:

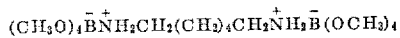

EXAMPLE XVI

*Preparation of Hexane Diamine-1,6-Di-(Boro Tri-Methylate-Nonylphenolate)*

22 grams, 0.1 mol, of nonylphenol were mixed with 10.4 grams, 0.1 mol, of tri-methyl borate. Thereafter 5.8 grams, 0.05 mol, of hexane diamine-1,6 was added and the reaction temperature rose from 26° C. to 40° C. and a white plastic material insoluble in water was obtained which was the hexane diamine-1,6-di-(boro trimethylate-nonylphenolate) having the formula:

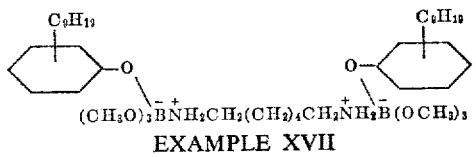

EXAMPLE XVII

*Preparation of Hexane Diamine-1,6-Di-(Boro Tri-Methylate-n-Hexylate)*

10.2 grams, 0.1 mol, of n-hexyl alcohol were mixed with 10.4 grams, 0.1 mol, of tri-methyl borate. Thereafter 5.8 grams, 0.05 mol, of hexane diamine-1,6 was added and the reaction temperature rose from 27° C. to 47° C. and a white plastic material insoluble in water was obtained which was the hexane diamine-1,6-di-(boro tri-methylate-n-hexylate) having the formula:

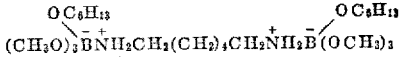

EXAMPLE XVIII

*Preparation of Hexane Diamine 1,6-Di-(Boro Tri-Methylate Dodecylate)*

18.6 grams, 0.1 mol, of dodecyl alcohol were mixed with 10.4 grams, 0.1 mol, of tri-methyl borate. Thereafter 5.8 grams, 0.05 mol, of hexane diamine 1,6 was added and the reaction temperature rose from 25° C. to 43° C. and a white plastic material insoluble in water was obtained which was the hexane diamine 1,6-di-(boro tri-methylate dodecylate) having the formula:

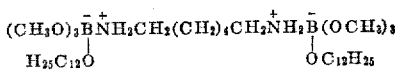

EXAMPLE XIX

*Preparation of Hexane Diamine 1,6-Di-(Boro Tri-Nonylphenolate-Methylate)*

3.2 grams, 0.1 mol, of methyl alcohol was added to 66.8 grams, 0.1 mol, of tri-nonylphenyl borate. Thereafter 5.8 grams, 0.05 mol, of hexane diamine-1,6 was added to the reaction product and the reaction temperature rose from 25° C. to 50° C. and a dark, tacky plastic material insoluble in water was obtained. The material obtained was hexane diamine 1,6-di-(boro tri-nonylphenolate-methylate) having the formula:

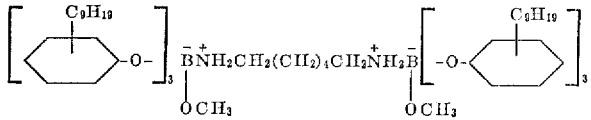

EXAMPLE XX

*Preparation of Hexane Diamine 1,6-Di-(Boro-Tetra Nonylphenolate)*

22 grams, 0.1 mol, of nonylphenol was added to 66.8 grams, 0.1 mol, of tri-nonylphenyl borate. Thereafter 5.8 grams, 0.05 mol, of hexane diamine-1,6 was added to the reaction product and the reaction temperature rose from 29° C. to 50° C. and a dark, tacky plastic material insoluble in water was obtained. The material obtained was hexane diamine 1,6-di-(boro-tetra-nonylphenolate) having the formula:

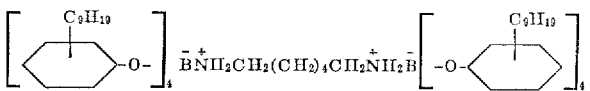

EXAMPLE XXI

*Preparation of Hexane Diamine-1,6-Di-(Boro Tri-Nonylphenolate n-Hexylate)*

10.2 grams, 0.1 mol, of n-hexyl alcohol was added to 66.8 grams, 0.1 mol, of tri-nonylphenyl borate. Thereafter 5.8 grams, 0.05 mol, of hexane diamine-1,6 was added to the reaction product and the reaction temperature rose from 25° C. to 52° C. and a very viscous amber liquid material which is insoluble in water was obtained. The material obtained was hexane diamine-1,6-di-(boro tri-nonylphenolate n-hexylate) having the formula:

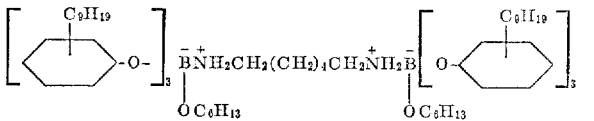

EXAMPLE XXII

*Preparation of Hexane Diamine-1,6-Di-(Boro Tri-Nonylphenolate Dodecylate)*

18.6 grams, 0.1 mol, of dodecyl alcohol was added to 66.8 grams, 0.1 mol, of tri-nonylphenyl borate. Thereafter 5.8 grams, 0.5 mol, of hexane diamine-1,6 was added to the reaction product and the reaction temperature rose from 25° C. to 42° C. and a very viscous amber liquid material which is insoluble in water was obtained. The material obtained was hexane diamine-1,6-di-(boro tri-nonylphenolate dodecylate) having the formula:

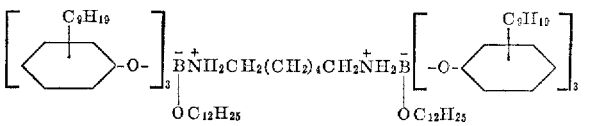

As is known in the art, many borate compounds do not always perform as satisfactory additives for lubricants, fuels and the like because of their hydrolytic instability and it is to this end that the salts of the present invention demonstrate at least one of their advantages. The amine salts of alkoxide, aryloxide and mercaptide tetra-covalent boron acids are hydrolytically stable.

The hydrolytic stability of the amine salt of alkoxide, aryloxide and mercaptide tetra-covalent boron acids of the present invention was determined qualitatively by storing the salts in water as well as in mineral oil blends containing the salts over water. Evidence of the hydrolytic instability was taken as the formation of sediment in the storage samples.

As is clear from the foregoing disclosure and examples, considerable latitude may be exercised in the choice of primary, secondary or tertiary amines and in the selection of the alkoxide, aryloxide and mercaptide tetra-covalent boron acid.

We claim:

1. Amine salts of tetra-covalent boron compounds:

and

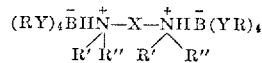

wherein Y is selected from the group consisting of oxygen and sulfur, X is an aliphatic hydrocarbylene radical containing 2 to 10 carbon atoms, R is a hydrocarbyl radical containing 1 to 24 carbon atoms, R' is selected from the group consisting of aliphatic hydrocarbyl and halogen substituted aliphatic hydrocarbyl radical containing one to about 30 carbon atoms and R'' and R''' are selected from the group consisting of hydrogen and aliphatic hydrocarbyl radical containing 1 to 24 carbon atoms.

2. Amine salts described in claim 1 wherein R' is an aliphatic hydrocarbyl radical containing 11 to 14 carbon atoms.

3. Amine salts described in claim 1 wherein R' is an aliphatic hydrocarbyl radical containing 18 to 22 carbon atoms.

4. An amine salt having the formula:

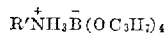

wherein R' is a tertiary alkyl group having 11 to 14 carbon atoms.

5. An amine salt having the formula:

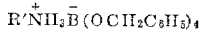

wherein R' is a tertiary alkyl group containing 11 to 14 carbon atoms.

6. An amine salt having the formula:

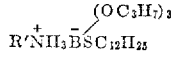

wherein R' is a tertiary alkyl group having 11 to 14 carbon atoms.

7. An amine salt having the formula:

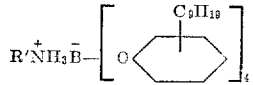

wherein R' is a tertiary alkyl group having 11 to 14 carbon atoms.

8. An amine salt having the formula:

9. An amine salt having the formula:

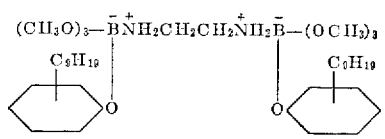

10. An amine salt having the formula:

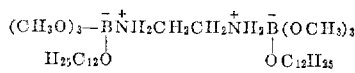

11. An amine salt having the formula:

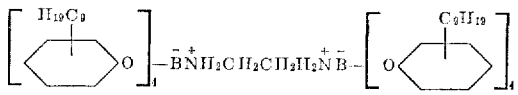

12. An amine salt having the formula:
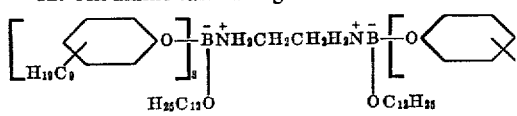
13. An amine salt having the formula:
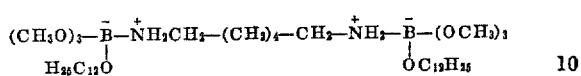
14. An amine salt having the formula:
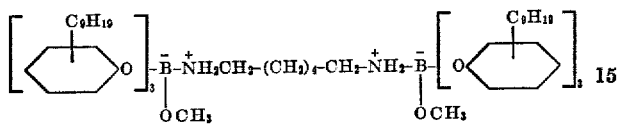
15. An amine salt having the formula:
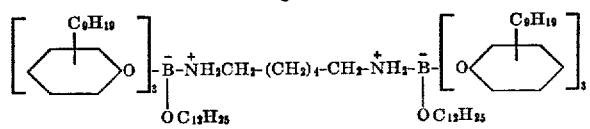
16. An amine salt having the formula:
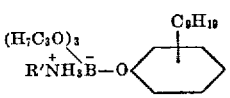
wherein R' is a tertiary alkyl group having 11 to 14 carbon atoms.
No references cited.

UNITED STATES PATENT OFFICE
CERTIFICATE OF CORRECTION

Patent No. 3,102,131            August 27, 1963

Edwin C. Knowles et al.

It is hereby certified that error appears in the above numbered patent requiring correction and that the said Letters Patent should read as corrected below.

Column 4, line 27, for "amino-boro" read -- amine-boro --; line 36, in the title of EXAMPLE VII, for "Di-(Boro-Tri-", in italics, read -- Di-(Boro-Tetra- --, in italics; lines 61 to 64, for that portion of the formula reading $C_9H_{10}$     read     $C_9H_{19}$ column 5, lines 64 to 68, the left-hand bracketed portion of the formula should appear as shown below instead of as in the patent:

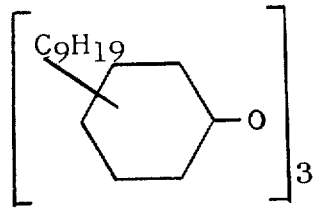

Signed and sealed this 26th day of May 1964.

(SEAL)
Attest:

ERNEST W. SWIDER
Attesting Officer

EDWARD J. BRENNER
Commissioner of Patents